United States Patent [19]
Mochizuki

[11] Patent Number: 5,854,919
[45] Date of Patent: Dec. 29, 1998

[54] PROCESSOR AND ITS OPERATION PROCESSING METHOD FOR PROCESSING OPERATION HAVING BIT WIDTH EXCEEDING DATA WIDTH OF BIT STORAGE UNIT

[75] Inventor: Hideo Mochizuki, Tokyo, Japan

[73] Assignee: NEC Corporation, Tokyo, Japan

[21] Appl. No.: 910,027

[22] Filed: Aug. 12, 1997

[30] Foreign Application Priority Data

Aug. 16, 1996 [JP] Japan .................................. 8-234741

[51] Int. Cl.$^6$ ....................................................... G06F 9/30
[52] U.S. Cl. ............................................. 395/561; 395/386
[58] Field of Search ................................. 395/386, 561

[56] References Cited

U.S. PATENT DOCUMENTS

| | | | |
|---|---|---|---|
| 4,301,514 | 11/1981 | Eifuku et al. ............................ | 395/386 |
| 5,168,571 | 12/1992 | Hoover et al. .......................... | 395/386 |
| 5,177,701 | 1/1993 | Iwasa ....................................... | 395/386 |
| 5,590,352 | 12/1996 | Zuraski, Jr. et al. ............... | 395/800.23 |
| 5,615,402 | 3/1997 | Quattromani et al. ............. | 395/800.38 |
| 5,680,632 | 10/1997 | Studor et al. ....................... | 395/800.43 |

*Primary Examiner*—Krisna Lim
*Attorney, Agent, or Firm*—Whitham, Curtis & Whitham

[57] ABSTRACT

The processor comprises a storage unit for accommodating data required for operations and operation results and an arithmetic unit for processing an operation using operation data read from the storage unit, and incorporates a operation command group for being executed by the arithmetic unit, generating an operation result having a bit width greater than the bit width of the storage unit and accommodating a part of the data of the operation result having a bit width less than the bit width of the storage unit and required for a subsequent operation in said operation data storing means as data to be accommodated in the storage unit.

14 Claims, 7 Drawing Sheets

FIG. 7

OPCODE

| bit 15..13 \ bit 12..10 | 0 | 1 | 2 | 3 | 4 | 5 | 6 | 7 | FORMAT |
|---|---|---|---|---|---|---|---|---|---|
| 0 | mov | add | srb | cmp | shl | shr | jmp | sar | I |
| 1 | mul | div | mulu | divu | or | and | xor | not | I |
| 2 | mov | add | setf | cmp | shl | shr | ei | sar | II / |
| 3 | trap / brkret | reti | halt / stby | | ldsr | stsr | di | (◇Bstr) | II / IV |
| 4 | Bcond / ABcond | | | | | | | | III |
| 5 | movea | addi | jr | jal | ori | andi | xori | movhi | IV/V |
| 6 | ld.b | ld.h | mulu | ld.w | st.b | st.h | maci | st.w | VI |
| 7 | in.b | in.h | caxi | in.w | out.b | out.h | Special | out.w | VI/VII/VIII |

BRANCH ON CONDITION
*(Bcond / ABcond)*

| bit 12 \ bit 11..9 | 0 | 1 | 2 | 3 | 4 | 5 | 6 | 7 |
|---|---|---|---|---|---|---|---|---|
| 0 | bv | bc / bl | bz / be | bnh | bn | br | blt | ble |
| 1 | bnv | bnc/bnl | bnz/bne | bh | bp | nop | bge | bgt |

SPECIAL *(Fpp)*

| bit 31..29 \ bit 28..26 | 0 | 1 | 2 | 3 | 4 | 5 | 6 | 7 |
|---|---|---|---|---|---|---|---|---|
| 0 | (◇cmpf.s) | | (◇cvt.ws) | (◇cvt.sw) | (◇addf.s) | (◇subf.s) | (◇mulf.s) | (◇divf.s) |
| 1 | | | | (◇trnc.sw) | | | | |
| 2 | satadd3 | satsub3 | min3 | max3 | | | | |
| 3 | shld3 | shrd3 | | | mact3 | mac3 | mult3 | mul3 |
| 4 | bild | bdid | bist | bdst | | | | |
| 5 | | | | | | | | |
| 6 | | | | | | | | |
| 7 | | | | | | | | |

PROCESSOR AND ITS OPERATION PROCESSING METHOD FOR PROCESSING OPERATION HAVING BIT WIDTH EXCEEDING DATA WIDTH OF BIT STORAGE UNIT

BACKGROUNDS OF THE INVENTION

1. Field of the Invention

The present invention relates to a processor and its operation processing method, and more particularly to a processor and its operation processing method that enable processing of an operation that generates an operation result having bit width (bus width, data width) exceeding the bit width of a data storage unit, without needing any complicated special operation.

2. Description of the Related Art

A widely known conventional method for processing an operation that generates an operation result having a bit width exceeding the bit width of a data storage unit in a processor and storing the operation result in the storage unit is to record the output of an arithmetic unit temporarily in temporary storage units and then transfer it to the storage unit in a sequential manner.

FIG. 8 is a block diagram showing the constitution of a conventional processor adopting the above-mentioned method. FIG. 9 is a pipeline processing diagram for the processor shown in FIG. 8. As illustrated, this processor comprises a storage unit 801 for storing data for operations, temporary storage units 802 and 803 for storing data required for an operation after it is read from the storage unit 801, an arithmetic unit 804 for processing an operation using the data held in the temporary storage units 802 and 803, a selector 805, and a temporary storage unit 806 for holding an operation result exceeding the bit width (i.e., bus width) of the storage unit 801.

Hereafter, a case where the operation shown below is processed on the above-described conventional processor is explained.

```
op1   r1, r2, r3
op2   r3, r4, r5, r6
op3   r7, r8
```

Here, "op 1" and "op 3" represent operation commands for generating an operation result having a bit width smaller than the bit width of the storage unit, and "op 2" represents an operation command for generating an operation result having a bit width exceeding the bit width of the storage unit.

When executing the pipeline processing as shown in FIG. 9, the processor, first in the cycle (1), reads data required for the operation command "op 1" from the storage unit 801 and holds it in the temporary storage units 802 and 803. In the next cycle (2), the processor executes an operation according to the operation command "op1" using the data held in the temporary storage units 802 and 803, and writes the operation result into the storage unit 801. Concurrently, it reads data required for the operation command "op 2" from the storage unit 801 and holds it in the temporary storage units 802 and 803.

In the cycle (3), the processor executes an operation according to the operation command "op 2" using the data held in the temporary storage units 802 and 803. Here, the operation command "op 2" generates an operation result exceeding the width of the storage unit 801, so the processor writes a part of the operation result into the storage unit 801 and writes the remainder of the operation result into the temporary storage unit 806. Concurrently, it reads data required for the operation command "op3" from the storage unit 801 and holds it in the temporary storage unit 802 and 803.

In the cycle (4), the processor writes into the storage unit 801 the remainder of the operation result from the operation command "op 2" that is held in the temporary storage unit 806. The operation command "op 3" is suspended, since writing into the storage unit 801 is impossible even if an operation is executed according to that operation command. In the cycle (5), the processor executes an operation according to the operation command "op 3", using the data held in the temporary storage units 802 and 803, and writes the operation result into the storage unit 801.

The above-described conventional processor and its operation processing method have problems as described below.

First, when writing into a storage unit an operation result having a bit width exceeding the bit width of the storage unit, conventional processors require a dedicated temporary storage unit solely for the purpose of holding the portion of an operation result exceeding the bit width of the storage unit, resulting in the problem that the scaling down of their circuit is hindered. The reason for this is that the bit width for processing is fixed in conventional processors and thus the bit width of data written into their storage unit is restricted.

Second, the execution of the next operation must be suspended in order for conventional processors to write into their storage unit the operation result of the previous cycle that is held in the dedicated temporary storage unit. The presence of an action that requires irregular control among regular processing actions creates the problem that control becomes complicated.

SUMMARY OF THE INVENTION

An object of the present invention is to provide a processor and an operation processing method for processing an operation that generates an operation result having a bit width in excess of the bit width of its storage unit without using a dedicated temporary storage unit, thereby reducing the size of the circuit.

Another object of the present invention is to provide a processor and an operation processing method where the control circuit remains less complicated and a faster operation speed can be achieved by executing an operation having a bit width in excess of the bit width of the storage unit without using any special processing.

According to the first aspect of the invention, a processor comprises operation data storing means for accommodating data required for operations and operation results, operation executing means for processing an operation using the operation data read from the operation data storing means, and means for accommodating in the operation data storing means a part of the data of the operation result having a bit width less than the bit width of the data storing means and required for a subsequent operation, when an operation result from the operation executing means has a bit width greater than the bit width of the operation data storing means.

The processor may further comprise operation command group for being executed by the operation executing means, generating an operation result having a bit width greater than the bit width of the operation data storing means, and accommodating a part of the data of the operation result having a bit width less than the bit width of the operation data storing means and required for a subsequent operation in the operation data storing means as data to be accommodated in the operation data storing means.

The processor may further comprise operation command group for being executed by the operation executing means, generating an operation result having a bit width greater than the bit width of the operation data storing means, and designating a part of the data of the operation result having a bit width less than the bit width of the operation data storing means and required for a subsequent operation as data to be accommodated in the operation data storing means, and selecting means for accommodating in the operation data storing means a part of the data of the operation result designated by the operation command group, by selecting them.

According to the second aspect of the invention, a processor, comprises operation data storing means for accommodating data required for operations and operation results, operation executing means for processing an operation using the operation data read from the operation data storing means, means for accommodating in the operation data storing means a part of the data of the operation result having a bit width less than the bit width of the data storing means, when an operation result from the operation executing means has a bit width greater than the bit width of the operation data storing means, means for generating the same operation result as the operation result by repeating the same operation processing by the operation executing means using the same operation data, when an operation result has a bit width greater than the bit width of the operation data storing means, and means for accommodating in the operation data storing means a part of the data of multiple operation results which are different from each other and which have a bit width less than the bit width of the operation data the storage unit by selecting them from the multiple operation results respectively.

The processor may further comprise an operation command group including a first operation command which is executed by the operation executing means, generates an operation result having a bit width greater than the bit width of the operation data storing means, and accommodates a part of the data of the operation result having a bit width less than the bit width of the operation data storing means as data to be accommodated in the operation data storing means, and a second operation command which generates the same operation result as the operation result by repeating the same operation processing using the same operation data as the first operation command and accommodates in the operation data storing means a part of the data of the operation result not accommodated by the first operation command.

The processor may further comprise operation command group including a first operation command which is executed by the operation executing means, generates an operation result having a bit width greater than the bit width of the operation data storing means, and designates a part of the data of the operation result having a bit width less than the bit width of the operation data storing means as data to be accommodated in the operation data storing means, and a second operation command which generates the same operation result as the operation result by repeating the same operation processing using the same operation data as the first operation command and designates a part of the data of the operation result not designated by the first operation command as a part of the data to be accommodated in the operation data storing means, and the selecting means for selecting a part of the data of the operation result designated by the first and second operation commands and accommodating them respectively in the operation data storing means.

In the preferred construction, the first operation command accommodates in the operation data storing means the high-order or low-order part of the data of the operation result having a bit width less than the bit width of the operation data storing means, and the second operation command accommodates in the operation data storing means the high- or low-order part of the data of the operation result which has not been accommodated by the first operation command.

In the preferred construction, the first operation command designates the high- or low-order part of the data of the operation result having a bit width less than the bit width of the operation data storing means, and the second operation command designates the high- or low-order part of the data of the operation result which has not been stored by the first operation command.

According to the third aspect of the invention, an operation processing method which executes an operation for operation data accommodated in the operation data storing means and which accommodates an operation result from such operation in the operation data storing means, comprising the steps of:

reading operation data from the operation data storing means accommodating data required for operations, processing an operation using the operation data which has been read, and accommodating a part of the data of the operation result having a bit width less than the bit width of the operation data storing means and required for a subsequent operation, when the operation result from the operation processing has a bit width greater than the bit width of the operation data storing means.

The operation processing method may further comprise an operation step of generating in the operation processing an operation result having a bit width greater than the bit width of the operation data storing means and accommodating in the operation data storing means a part of the data of the operation result having a bit width less than the bit width of the operation data storing means and required for a subsequent operation as data to be accommodated in the operation data storing means.

The operation processing method may further comprise an operation step of generating in the operation processing an operation result having a bit width greater than the bit width of the operation data storing means and designating a part of the data of the operation result having a bit width less than the bit width of the operation data storing means and required for a subsequent operation as data to be accommodated in the operation data storing means, and an operation step of accommodating in the operation data storing means a part of the data of the operation result designated by the operation command, by selecting it.

According to another aspect of the invention, an operation processing method which executes an operation for operation data accommodated in the operation data storing means and which accommodates an operation result from such operation in the operation data storing means, comprising the steps of:

reading operation data from the operation data storing means accommodating data required for operations, executing operation processing using the read operation data, generating the same operation result as the operation result by repeating the same operation processing using the same operation data, when the operation result has a bit width greater than the bit width of the operation data storing means, and accommodating in the operation data storing means a part of the data of multiple operation results which are different from each other and which have a bit width less than the bit width of the operation data storing means by selecting them from the multiple operation results respectively.

The operation processing method may further comprise first operation step of generating in the operation processing an operation result having a bit width greater than the bit width of the operation data storing means and designating a part of the data of the operation result having a bit width less than the bit width of the operation data storing means as data to be accommodated in the operation data storing means, and second operation step of generating the same operation result as the operation result by repeating the same operation processing using the same operation data as the first operation step and designating a part of the data of the operation result not designated by the first operation step as data to be accommodated in the operation data storing means, and a step of selecting the a part of the data of the operation result designated by the first and second operation steps and accommodating them respectively in the operation data storing means.

Preferably, the first operation step accommodates in the operation data storing means the high- or low-order part of the data of the operation result having a bit width less than the bit width of the operation data storing means, and the second operation step accommodates in the operation data storing means the high- or low-order part of the data of the operation result which has not been accommodated by the operation command of the first operation step.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a chart showing a list of command codes incorporated in an embodiment of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
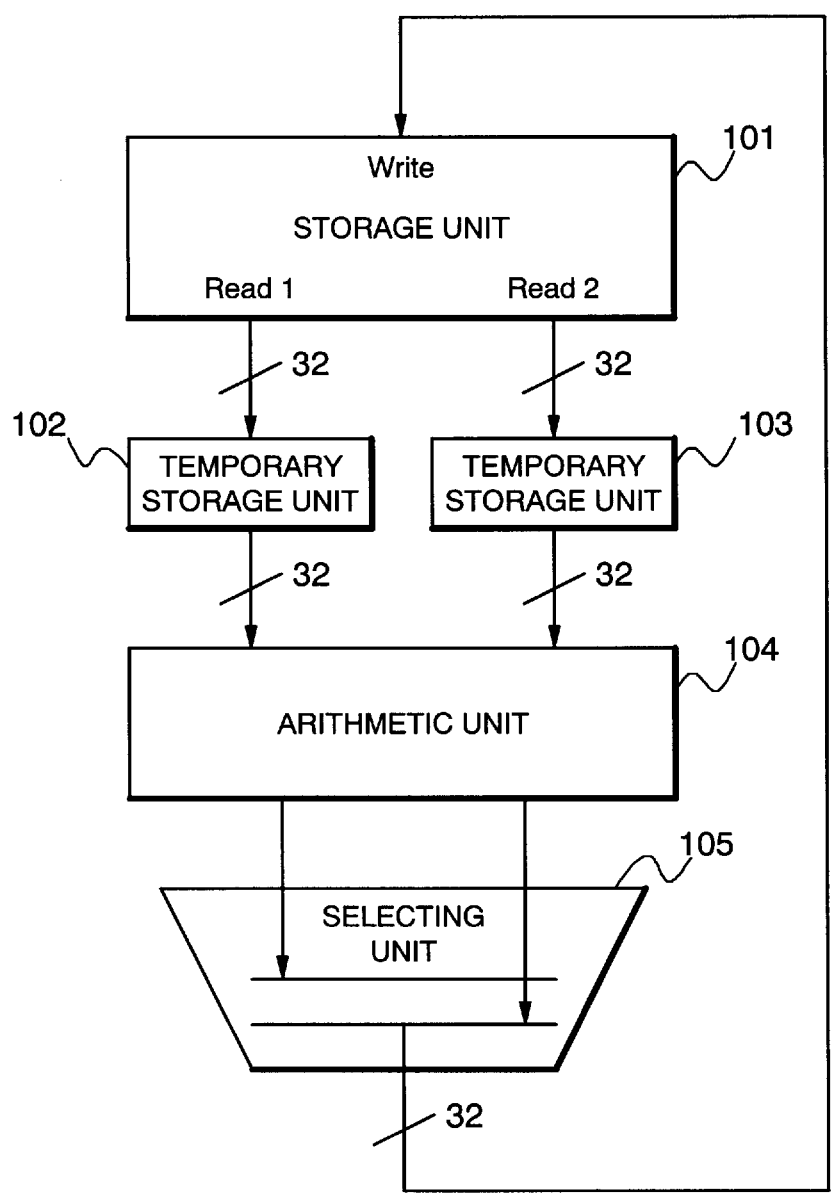
FIG. 1 is a block diagram showing the constitution of a processor according to the form of embodiment of the present invention.

FIG. 1 is a block diagram showing the constitution of a processor according to the form of embodiment of the present invention.

As shown in FIG. 1, this processor comprises a storage unit 101 for storing data required for operations and operation result, temporary storage units 102 and 103 for storing data required for an operation after reading it from the storage unit 101, an arithmetic unit 104 for processing an operation using the data held in the temporary storage units 102 and 103, a selecting unit 105 for selecting the data from an operation result in accordance with an operation command's designation when the operation result exceeds the bit width (bus width) of the storage unit 101, and has an operation command group for designating data from an operation result for storage when the operation result has a bit width greater than the bit width of the storage unit 101.

Following is an explanation of a processor constituted as described above concerning a case where the first operation processing which executes an operation that generates an operation result having a bit width greater than the bit width of the storage unit 101 and then uses only a part of the operation result for a subsequent operation, as shown below.

$$
\begin{array}{lll}
op1 & r1, & r2, & r3 \\
op2a & r3, & r4, & r51 \\
op3 & r7, & r8 &
\end{array}
$$

Here, "op 2a" is an operation command that belongs to a command group according to the present invention and that generates an operation result having a bit width greater than the bit width of the storage unit 101 and writes a part of the operation result into the storage unit 101; "op 1" and "op 3" are operation commands that generate an operation result having a bit width smaller than the bit width of the storage unit 101. For example, in a case where the bit width of the storage unit 101 is 32 bits and the operation result generated by an operation according to the operation command "op 2a" is 64 bits, the operation command "op 2a" writes into the storage unit 101 higher- or low-order 32 bits which are a part of the operation result.

In the aforementioned operation processing, an example is shown in which an operation that generates an operation result having a bit width greater than the bit width of the storage unit 101 is executed according to the operation command "op 2a" and then only a part of the operation result (data smaller than the bit width of the storage unit 101) is stored in the storage unit 101 for use by a subsequent operation.

Figure 3:
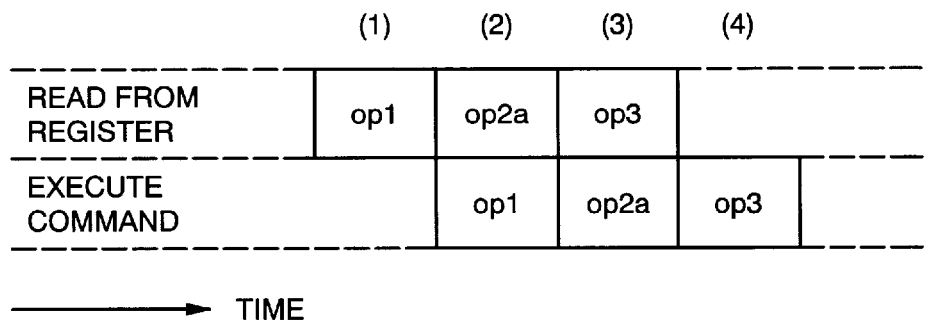
FIG. 3 is a pipeline processing diagram for the first operation processing in the form of embodiment of the present invention.

FIG. 3 shows a pipeline processing diagram for cases where the aforementioned operation processing is executed by the processor. As shown in FIG. 3, the processor, first in the cycle (1), reads data required for the operation command "op 1" from the storage unit 101 and holds it in the temporary storage units 102 and 103.

In the next cycle (2), the processor executes an operation according to the operation command "op1" by the arithmetic unit 104, using the data held in the temporary storage units 102,103, and writes the result of the operation in the storage unit 101. Concurrently, in the current cycle, it reads data required for the operation command "op 2a" from the storage unit 101 and holds it in the temporary storage units 102 and 103.

Further, in the next cycle (3), the processor executes an operation according to the operation command "op 2a" using the data held in the temporary storage units 102 and 103, selects by the selecting unit 105 a part of the data of the operation result having a bit width greater than the bit width of the storage unit 101 (for example, a predetermined number of high-order bits), and writes it into the storage unit 101. Concurrently, it reads data required for the operation command "op3" from the storage unit 101 and holds it in the temporary storage units 102 and 103.

In the cycle (4), the processor executes an operation according to the operation command "op 3" using the data held in the temporary storage units 102 and 103, and writes the operation result into the storage unit 101.

Thus, in an operation in which an operation that generates an operation result having a bit width exceeding the bit width of the data storage unit 101 is executed and only a part of the operation result is used in a subsequent operation, special processing for writing into a storage unit in order to deal with the portion of data in excess of the bit width of the storage unit becomes unnecessary by using the operation command "op 2a" that generates an operation result having a bit width greater then the bit width of the storage unit 101 which belongs to a command group according to the present invention and writes a part of the operation result into the temporary storage units 102 and 103, thereby permitting the next operation to be processed without delay. Also, the use of an operation command as described above eliminates the need for a dedicated temporary storage unit used solely for holding the portion of an operation result in excess of the bit width of the storage unit 101.

Following is an explanation of a processor constituted as described above concerning a case where the second operation processing which executes an operation that generates an operation result having a bit width greater than the bit width of the storage unit 101 and then uses all of the operation result for a subsequent operation.

```
op1    r1,  r2,  r3
op2a   r3,  r4,  r5
op2b   r3,  r4,  r6
op3    r7,  r8
```

Here, "op 2b" is an operation command that belongs to a command group according to the present invention and that generates an operation result having a bit width greater than the bit width of the storage unit 101 and writes a part of the operation result into the storage unit 101. This operation command "op 2b" executes the same operation as the operation command "op 2a" (using the same operation data) and writes into the storage unit 101 the part of the operation result that is not written into the storage unit 101 by the operation command "op2a."

For example, in the above-described case where the bit width of the storage unit 101 is 32 bits and the operation result generated by an operation according to the operation command "op 2a" is 64 bits, if the operation command "op 2a" is an operation command that writes into the storage unit 101 the high-order 32 bits which are a part of the operation result, then the operation command "op 2b" becomes an operation command that generates an operation result having a bit width of 64 by executing an operation using the same data and writes into the storage unit 101 the low-order 32 bits which are a part of the operation result.

Figure 4:
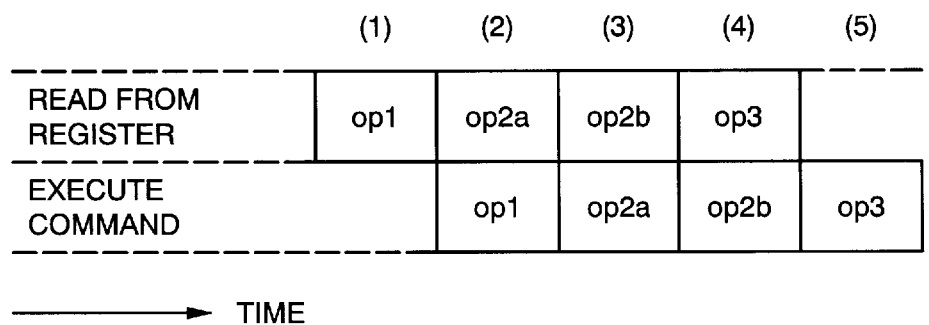
FIG. 4 is a pipeline processing diagram for the second operation processing in the form of embodiment of the present invention.

FIG. 4 shows a pipeline processing diagram for cases where the aforementioned operation processing is executed by the processor. As shown in FIG. 4, the processor, first in the cycle (1), reads data required for the operation command "op 1" from the storage unit 101 and holds it in the temporary storage units 102 and 103.

In the next cycle (2), the processor executes an operation according to the operation command "op1" using the data held in the temporary storage units 102 and 103, and writes the result of the operation in the storage unit 101. Concurrently, it reads data required for the operation command "op 2a" from the storage unit 101 and holds it in the temporary storage units 102 and 103.

In the next cycle (3), the processor executes an operation according to the operation command "op 2a" using the data held in the temporary storage units 102 and 103, and writes into the storage unit 101 the part of the operation result obtained from the operation and having a bit width greater than the bit width of the storage unit 101 (for example, a predetermined number of high-order bits). Concurrently, it reads data required for the operation command "op 2b" from the storage unit 101 and holds it in the temporary storage units 102 and 103.

In the next cycle (4), the processor executes an operation according to the operation command "op 2b" using the data held in the temporary storage units 102 and 103, and writes into the storage unit 101 the part of the operation result obtained from the operation and having a bit width greater than the bit width of the storage unit 101 (for example, a predetermined number of low-order bits). Concurrently, it reads data required for the operation command "op 3" from the storage unit 101 and holds it in the temporary storage units 102 and 103.

In the next cycle (5), the processor executes an operation according to the operation command "op 3" using the data held in the temporary storage units 102 and 103, and writes the operation result into the storage unit 101.

Thus, in an operation in which an operation that generates an operation result having a bit width exceeding the bit width of the data storage unit 101 is executed and all of the operation result is used in a subsequent operation, special processing for writing into a storage unit in order to deal with the portion of data in excess of the bit width of the storage unit held in the temporary storage unit becomes unnecessary by using the operation command "op 2a" that generates an operation result having a bit width greater than the bit width of the storage unit 101 which belongs to a command group according to the present invention and writes a part of the operation result into the storage unit and the operation command "op 2b" that executes the same operation as the operation command "op 2a" and writes into the storage unit 101 the part of the operation result not written into the storage unit 101 by the operation command "op 2a", thereby permitting the next operation to be processed without delay.

Also, the use of an operation command as described above eliminates the need for a dedicated temporary storage unit used solely for holding the portion of an operation result in excess of the bit width of the storage unit 101.

Next, an embodiment of the present invention is explained using FIG. 2 and FIGS. 5 to 7.

Figure 2:
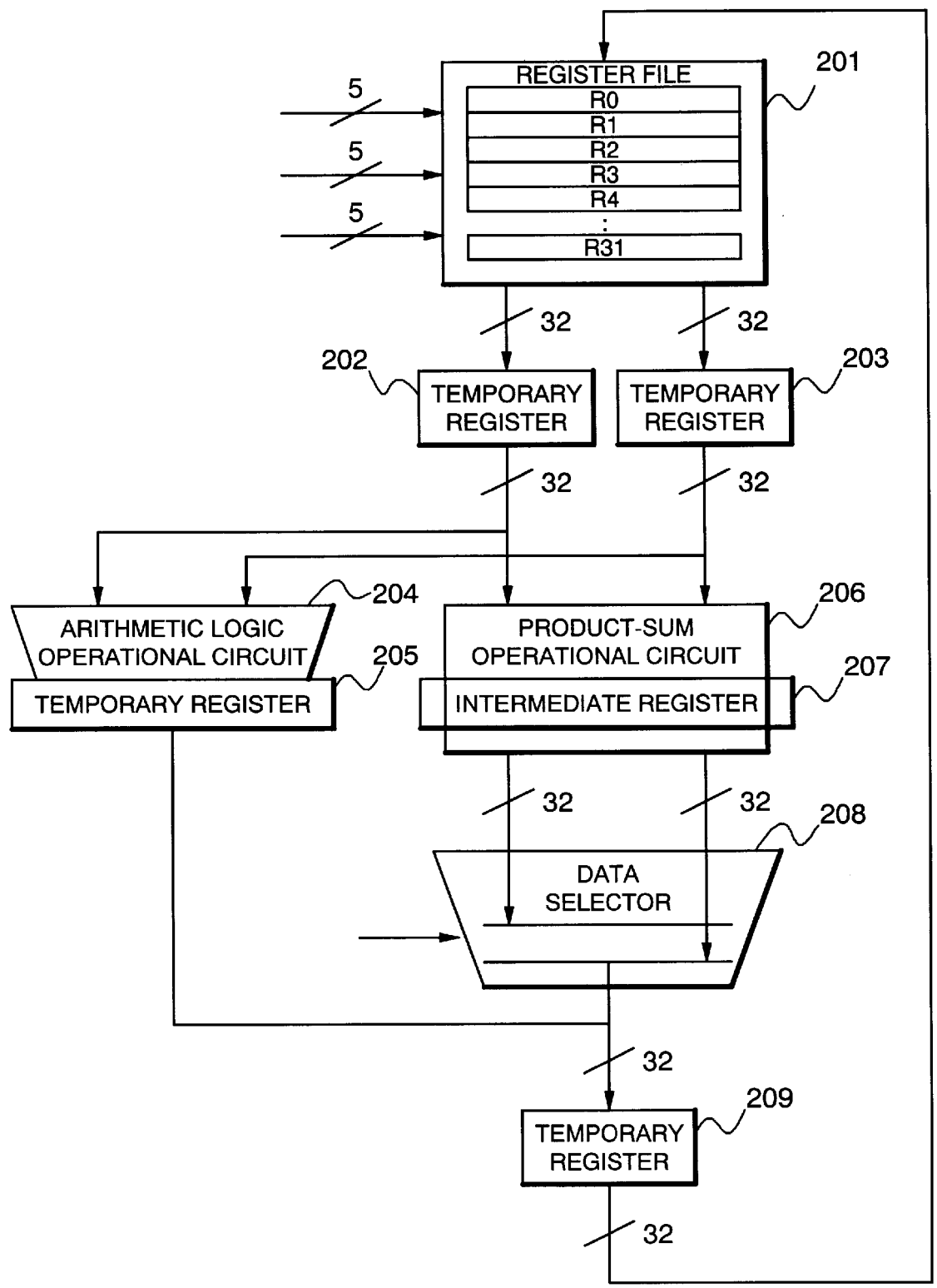
FIG. 2 is a block diagram showing the constitution of a microprocessor according to an embodiment adopting the present invention.

FIG. 2 is a block diagram showing the constitution of the operation execution unit of an RISC-type microprocessor of a five-tier pipeline structure according to an embodiment adopting the present invention. Here, 201 is a register file which is a 32 bits×32 lines storage unit and accommodates data and operation results required for operations, 202 and 203 are temporary registers, 204 is an arithmetic logic operation circuit, 205 is a temporary register for the arithmetic logic operation circuit 204, 206 is a product-sum operation circuit, 207 is an intermediate register for the product-sum operation circuit 206, 208 is a data selector, and 209 is a temporary register.

FIG. 7 shows a list of command sets incorporated in the above-mentioned microprocessor. Of the machine language command sets shown in FIG. 7, the operation commands "mult3" and "mact3" are command sets of an embodiment of the present invention.

In the operation "mult3 r3, r4, r5" using the operation command "mult3", such operation processing is executed that the 32-bit data of "r3" and that of "r4" are multiplied and the high-order 32 bits within the resulting 64-bit data are written into "r5".

In the operation "mact3 r3, r4, r5" using the operation command "mact3", such operation processing is executed that the 32-bit data of "r3" and that of "r4", are multiplied, the high-order 32 bits within the resulting 64-bit data and the content of "r5" are added up, and the result of the addition is written into "r5".

These operation commands "mult3" and "mact3" are concrete operation commands that are included in the kinds of the above-described operation command "op 2a".

Actions of the present embodiment are explained below, taking as an example the execution of the below-listed command lines by use of the aforementioned operation command "mult3". The operation processing for these command lines corresponds to the first operation processing which executes an operation that generates an operation result having a bit width greater than the bit width of the storage unit 101 described in the form of embodiment and then uses only a part of the operation result for a subsequent operation.

```
xor    r1,  r2
mult3  r3,  r4,  r5
add    r7,  r8
```

Figure 5:
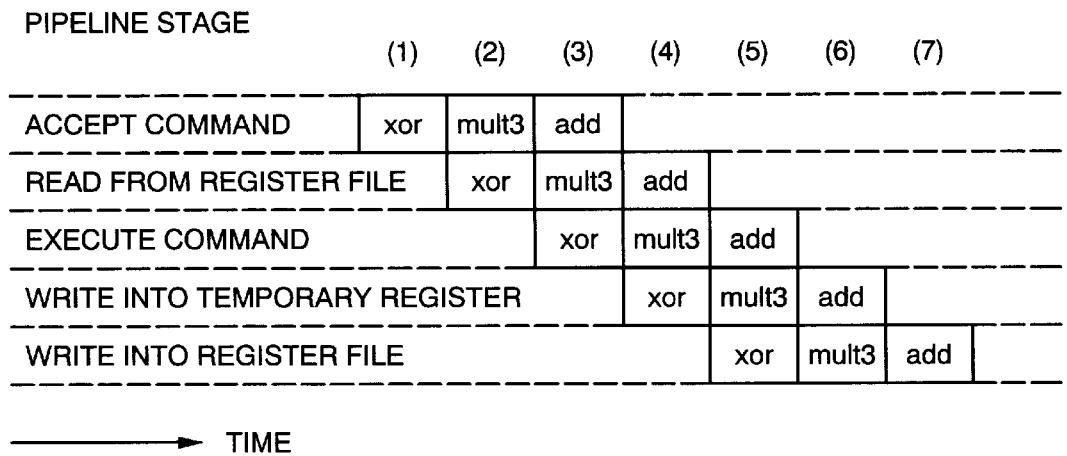
FIG. 5 is the first pipeline processing diagram for an embodiment of the present invention.

FIG. 5 is a pipeline processing diagram for a case where command lines similar to the above are executed by a microprocessor of the present embodiment.

In the first step (1), the microprocessor first accepts the machine language command "xor". In the next cycle (2), it accepts the machine language command "mult3", and concurrently reads the data required for the operation command "xor" from the register file 201 and holds it in the temporary registers 202 and 203.

In the next cycle (3), the microprocessor accepts the machine language command "add". Concurrently, it executes an operation according to the operation command "xor" by the arithmetic logic operation circuit 204, using the data held in the temporary registers 202 and 203, and holds the operation result in the temporary register 205. Concurrently, it reads the data required for the operation command "mult3" from the register file 201 and holds it in the temporary registers 202 and 203.

In the next cycle (4), the microprocessor writes into the temporary register 209 the operation result from the operation command "xor" held in the temporary register 205. Concurrently, it commences an operation according to the operation command "mult3" by the product-sum operation circuit 204, using the data held in the temporary registers 202 and 203, and holds the intermediate result of the operation in the register 207. Also concurrently, it reads the data required for the operation command "add" from the register file 201 and holds it in the temporary registers 202 and 203.

In the next cycle (5), the microprocessor writes into the temporary register 201 the operation result from the operation command "xor" held in the temporary register 209. Concurrently, it commences the latter part of the operation according to the operation command "mult3" by the product-sum operation circuit 206, using the data held in the intermediate register 207, and holds the high-order 32 bits of the operation result in the temporary register 309. Also concurrently, it executes an operation according to the operation command "add" by the arithmetic logic operation circuit 204, using the data held in the temporary registers 202 and 203 and holds the operation result in the temporary registers 205.

In the next cycle (6), the microprocessor writes into the register file 201 the operation result from the operation command "mult3" held in the temporary register 209. Concurrently, it writes into the temporary register 209 the operation result from the operation command "add" held in the temporary register 206. In the next cycle (7), it writes into the register file 201 the operation result from the operation command "add" held in the temporary register 209.

Thus, a microprocessor of the present embodiment is capable of executing a multiplication between 32-bit data and obtain a high-order, 32-bit operation result as required without performing complicated control that may disarray pipeline processing.

Also, the microprocessor has the operation command "mult13", a machine language command, as one of its command sets. In the operation "mult13 r3, r4, r5" using this operation command "mult13", such operation processing is executes that the 32-bit data of "r3" and that of "r4" are multiplied and the low-order 32 bits within the resulting 64-bit data are written into "r5" This operation command "mult13" is a concrete operation command that is included in the kinds of the above-mentioned operation command "op 2b". This operation command "mult13" executes the same operation as the operation command "mult3" and writes into the storage unit a part of the operation result not written into the storage unit by the operation command "mult3".

Next, actions of a microprocessor of the present embodiment are explained below, taking as an example the execution of the below-listed command lines by use of the aforementioned operation commands "mult3" and "mult13". The operation processing for these command lines corresponds to the second operation processing which executes an operation that generates an operation result having a bit width greater than the bit width of the storage unit described in the form of embodiment and then uses all of the operation result for a subsequent operation.

```
      .
      .
      .
xor     r1, r2
mult3   r3, r4, r5
mult13  r3, r4, r6
add     r7, r8
      .
      .
      .
```

Figure 6:
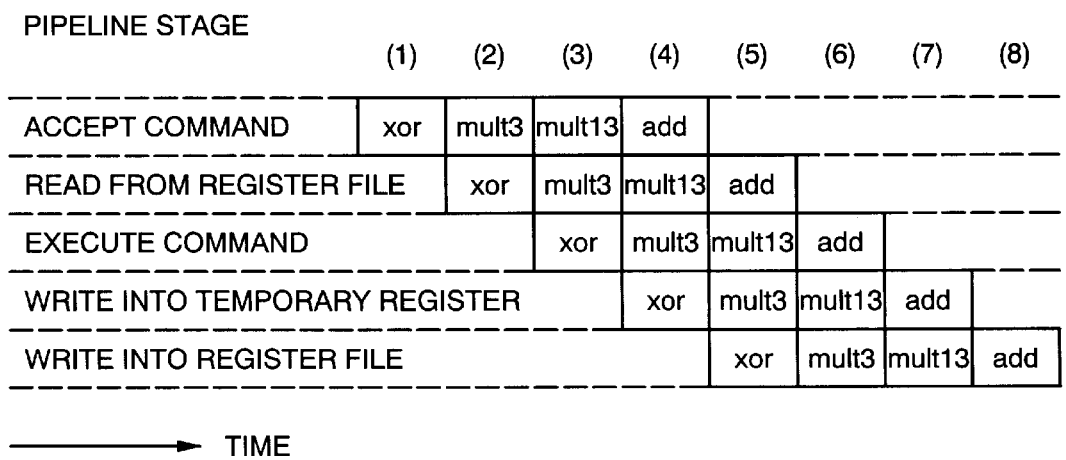
FIG. 6 is the second pipeline processing diagram for an embodiment of the present invention.
Figure 8:
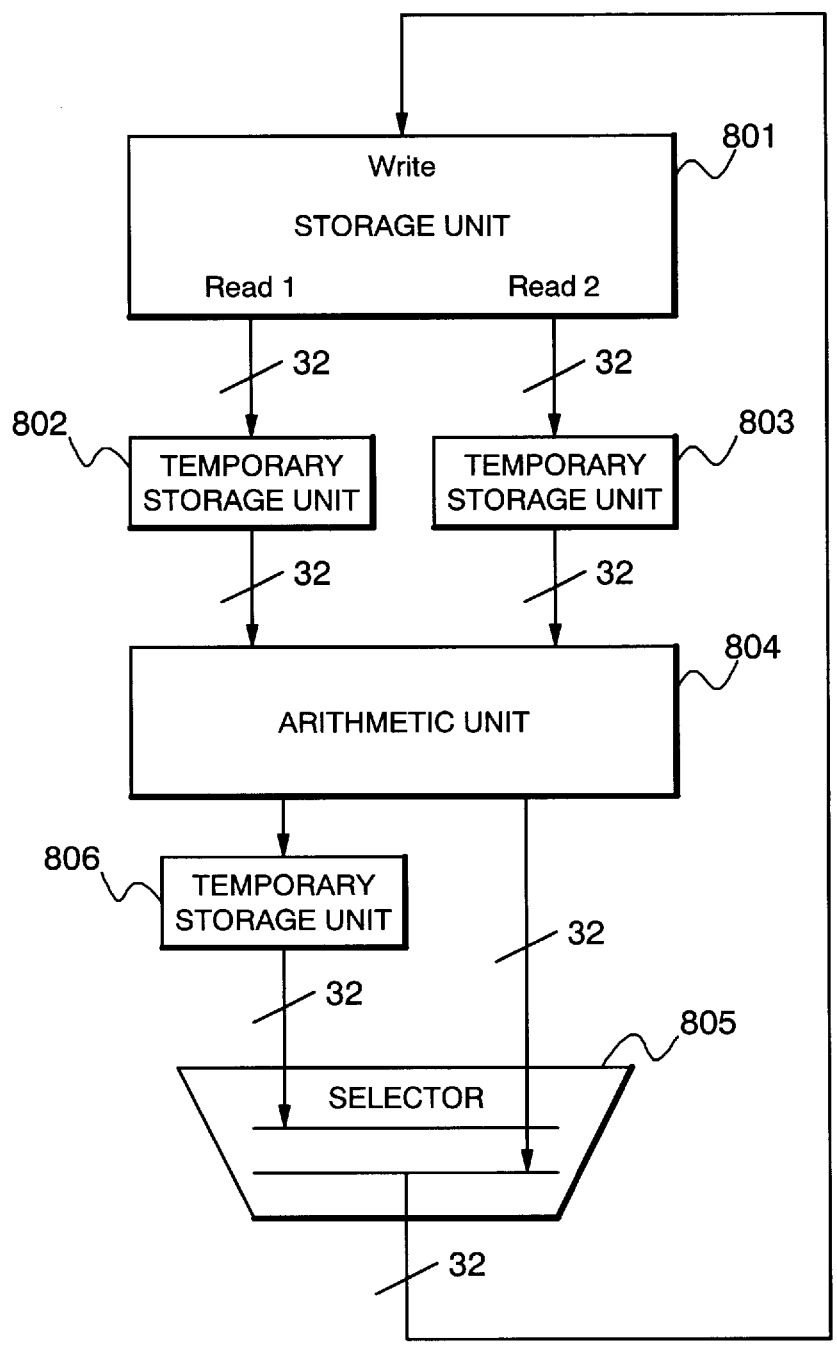
FIG. 8 is a block diagram showing the constitution of a conventional processor.
Figure 9:
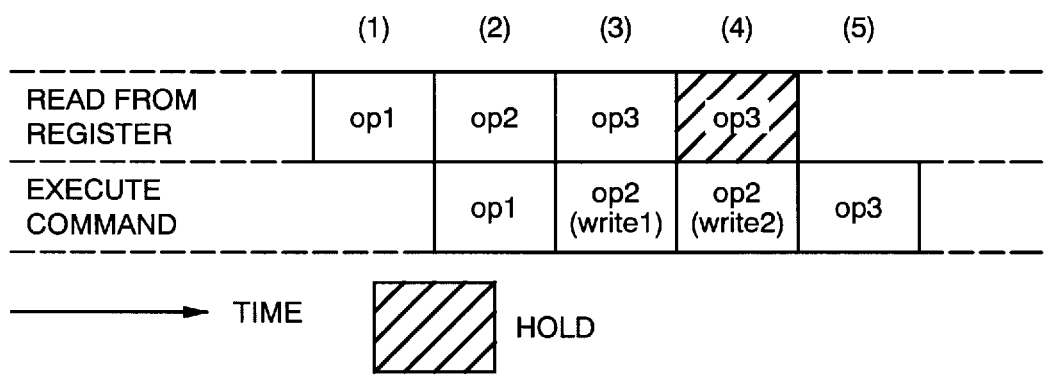
FIG. 9 is a typical pipeline processing diagram for conventional processors.

FIG. 6 is a pipeline processing diagram showing the aforementioned command lines. First, in the cycle (1), the microprocessor accepts the operation command "xor".

In the next cycle (2), the microprocessor accepts the operation command "mult3". Concurrently, it reads data required for the operation command "xor" from the register file 201 and holds it in the temporary registers 202 and 203.

In the next cycle (3), the microprocessor accepts the operation command "mult13". Concurrently, it executes an operation according to the operation command "xor" by the arithmetic logic operation circuit 204, using the data held in the temporary registers 202 and 203, and holds the operation result in the temporary register 205. Concurrently, it reads the data required for the operation command "mult3" from the register file 201 and holds it in the temporary registers 202 and 203.

In the next cycle (4), the microprocessor accepts the operation command "add". Concurrently, it writes into the temporary register 209 the operation result from the operation command "xor" held in the temporary register 205. Concurrently, it commences an operation according to the operation command "mult3" by the product-sum operation circuit 206, using the data held in the temporary registers 202 and 203, and holds the intermediate result of the operation in the intermediate register 207. Also concurrently, it reads the data required for the operation command "mult13" from the register file 201 and holds it in the temporary registers 202 and 203.

In the next cycle (5), the microprocessor writes into the temporary register 201 the operation result from the operation command "xor" held in the temporary register 209. Concurrently, it commences the latter part of the operation according to the operation command "mult3" by the product-sum operation circuit 206, using the data held in the intermediate register 207, and holds the high-order 32 bits of the operation result in the temporary register 209. Concurrently, it commences an operation according to the operation command "mult13" by the product-sum operation circuit 206, using the data held in the temporary registers 202 and 203, and holds the intermediate result of the operation in the intermediate register 207. Also concurrently, it reads the data required for the operation command "add" from the register file 201 and holds it in the temporary registers 202 and 203.

In the next cycle (6), the microprocessor writes into the temporary register 201 the operation result from the operation command "mult3" held in the temporary register 209. Concurrently, it commences the latter part of the operation according to the operation command "mult13", by the product-sum operation circuit 206, using the data held in the intermediate register 207, and holds the high-order 32 bits of the operation result in the temporary register 209. Concurrently, it executes an operation according to the operation command "add" by the arithmetic logic operation circuit 204, using the data held in the temporary registers 202 and 203, and holds the operation result in the intermediate register 206.

In the next cycle (7), it writes into the register file 201 the operation result from the operation command "mult13" held in the temporary register 209. Concurrently, it writes into the temporary register 209 the operation result from the operation command "add" held in the temporary register 205.

In the next cycle (8), it writes into the register file 201 the operation result from the operation command "add" held in the temporary register 209.

Thus, a microprocessor of the second embodiment is capable of executing a multiplication between 32-bit data and obtain a 64-bit operation result whose bit width is greater than the bit width of the register file 201, a storage unit, without performing complicated control that may disarray pipeline processing.

As described in the foregoing, the processor and the operation processing methods of the present invention provide the effects as described below.

First, because of the constitution that writes only the required part of an operation result selectively into a storage unit when executing an operation that generates an operation result having a bit width greater than the bit width of the storage unit, it has become unnecessary to provide a dedicated temporary storage for holding the part of an operation result in excess of the bit width of the storage unit in an operation that generates an operation result having a bit width greater than the bit width of the storage unit.

Second, since an operation result can be obtained without causing the operation processing by pipeline control to be disarrayed due to special processing by writing only the required part of an operation result selectively into a storage unit when executing an operation that generates an operation result having a bit width greater than the bit width of the storage unit, processing by regular pipeline control can be maintained even when executing an operation that generates an operation result having a bit width greater than the bit width of the storage unit, thereby permitting control to be simplified.

Third, when all of an operation result having a bit width greater than the bit width of the storage unit is required, the same operation result is generated by repeating the same operation processing using the same operation data, and then a part of the data of the multiple operation results which are different from each other and which have a bit width less than the bit width of the storage unit are selected from the multiple operation results respectively and accommodated in the storage unit, thereby eliminating the necessity for providing a dedicated temporary storage unit used solely for holding the part of an operation result in excess of the bit width of the storage unit as well as permitting an operation result having a bit width greater than the bit width of the storage unit to be obtained without causing the operation processing by pipeline control to be disarrayed by special processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A processor, comprising:
   operation data storing means for storing data required for operations and operation results;
   operation executing means for processing an operation using the operation data read from said operation data storing means; and
   means for storing an operation result from said operation executing means having a bit width greater than the bit width of said operation data storing means directly in said operation data storing means, a part of the data of said operation result being stored as a bit width less than OR equal to the bit width of said data storing means and being required for a subsequent operation.

2. The processor as set forth in claim 1, further comprising
   an operation command group being executed by said operation executing means, said operation command group generating operation results having a bit width greater than the bit width of said operation data storing means, and being stored directly in said operation data storing means a part of the data of each of the greater bit width operation results said part having a bit width less than or equal to the bit width of said operation data storing means and required for a subsequent operation.

3. The processor as set forth in claim 1, further comprising:
   an operation command group being executed by said operation executing means, said operation command group generating operation results having a bit width greater than the bit width of said operation data storing means, and designating a part of the data of the operation result having a bit width less than or equal to the bit width of said operation data storing means and required for a subsequent operation as data to be stored directly in said operation data storing means, and
   selecting means for selecting and storing directly in said operation data storing means a part of the data of said operation result designated by said operation command group.

4. A processor, comprising:
   operation data storing means for storing data required for operations and operation results;
   operation executing means for processing an operation using the operation data read from said operation data storing means;
   means for storing an operation result from said operation executing means having a bit width greater than the bit width of said operation data storing means directly in said operation data storing means, a first part of the data of said operation result being stored having a bit width less than or equal to the bit width of said data storing means;
   means for regenerating said operation result by repeating the same operation processing by said operation executing means using the same operation data; and
   means for directly storing in said operation data storing means said first and a regenerated part of the data of said operation result, said first and said regenerated part being different from each other and having a bit width less than or equal to the bit width of said operation data storage unit.

5. The processor as set forth in claim 4, further comprising:
   an operation command group including a first operation command which is executed by said operation executing means, generates an operation result having a bit width greater than the bit width of said operation data storing means, and stores a part of the data of the operation result having a bit width less than or equal to the bit width of said operation data storing means as data directly in said operation data storing means, and a second operation command which regenerates said operation result by repeating the same operation using the same operation data as said first operation command and directly stores a part of the data of the operation result in said operation data storing means.

6. The processor as set forth in claim 4, further comprising:
   an operation command group including a first operation command which is executed by said operation executing means, generates an operation result having a bit width greater than the bit width of said operation data storing means, and designates a part of the data of the operation result having a bit width less than or equal to the bit width of said operation data storing means as data to be directly stored in said operation data storing means, and a second operation command which regenerates said operation result by repeating the same operation using the same operation data as said first operation command and designates a part of the data of the operation result not designated by said first operation command as a part of the data to be directly stored in said operation data storing means, and
   said selecting means for selecting and directly storing in said operation data storing means each said part of the data of said operation result designated by said first and second operation commands.

7. The processor as set forth in claim 5, wherein
   said stored part in said first operation command directly stored in said operation data storing means is the high-order or low-order part of the data of said operation result, and
   said stored part in said second operation command directly stored in said operation data storing means the high-order or low-order part of the data of said operation result not stored in said first operation command.

8. The processor as set forth in claim 6, wherein said first operation command designates the high-order or low-order part of the data of said operation result, and said second operation command designates the high-order or low-order part of the data of said operation result which has not been stored by said first operation command.

9. An operation processing method which executes an operation for operation data stored in the operation data storing means and which stores an operation result from such operation in said operation data storing means, comprising the steps of:

reading operation data from the operation data storing means storing data required for operations;

processing an operation using said operation data which has been read; and directly storing a first part of the data of said operation result having a bit width less than or equal to the bit width of said operation data storing means and required for a subsequent operation, when said operation result from said operation processing has a bit width greater than the bit width of said operation data storing means.

10. The operation processing method as set forth in claim 9, further comprising:

an operation step of generating in said operation processing an operation result having a bit width greater than the bit width of said operation data storing means and directly storing in said operation data storing means a part of the data of said operation result having a bit width less than or equal to the bit width of said operation data storing means and required for a subsequent operation.

11. The operation processing method as set forth in claim 9, further comprising:

an operation step of generating in said operation processing an operation result having a bit width greater than the bit width of said operation data storing means and designating a part of the data of said operation result having a bit width less than or equal to the bit width of said operation data storing means and required for a subsequent operation as data to be directly stored in said operation data storing means, and an operation step of directly storing in said operation data storing means, a part of the data of said operation result designated by said operation command, by selecting it.

12. An operation processing method which executes an operation for operation data stored in the operation data storing means and which directly stores an operation result from such operation in said operation data storing means, comprising the steps of:

reading operation data from the operation data storing means storing data required for operations;

executing operation processing using said read operation data, an operation result being generated from said execution;

regenerating said operation result by re-executing the same operation processing using the same operation data, when the operation result has a bit width greater than the bit width of said operation data storing means; and directly storing in said operation data storing means a part of the data each of the multiple operation results, each said part being different from the other and having a bit width less than or equal to the bit width of said operation data storing means by selecting them from said multiple operation results respectively.

13. The operation processing method as set forth in claim 12, further comprising:

a first operation step of generating in said operation processing an operation result having a bit width greater than the bit width of said operation data storing means and designating a part of the data of said operation result having a bit width less than or equal to the bit width of said operation data storing means as data to be stored in said operation data storing means, and second operation step of regenerating said operation result by repeating the same operation processing using the same operation data as said first operation step and designating a part of the data of the operation result not designated by said first operation step as data to be stored in said operation data storing means, and a step of selecting each part of the data of said operation result designated by said first and second operation steps and directly storing them respectively in said operation data storing means.

14. The operation processing method as set forth in claim 13, wherein said first operation step directly stores the high-order or low-order part of the data of said operation result in said operation data storing means, and said second operation step directly stores in said operation data storing means the high-order or low-order part of the data of said operation result which has not been stored by the operation command of said first operation step.

* * * * *